(12) United States Patent
Readnour-Gouge et al.

(10) Patent No.: US 11,268,886 B2
(45) Date of Patent: Mar. 8, 2022

(54) PORTABLE AUTOMATIC AIR SAMPLING DEVICE AND METHOD OF COLLECTING AIR SAMPLES THEREFROM

(71) Applicant: The Procter & Gamble Company, Cincinnati, OH (US)

(72) Inventors: Christine Marie Readnour-Gouge, Ft. Mitchell, KY (US); Kevin Arthur Tewell, Fairfield, OH (US); Freddie Kendall, Jr., Cincinnati, OH (US); David Lawrence Harmon, Symmes Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/910,140

(22) Filed: Jun. 24, 2020

(65) Prior Publication Data

US 2020/0408649 A1    Dec. 31, 2020

Related U.S. Application Data

(60) Provisional application No. 62/867,360, filed on Jun. 27, 2019.

(51) Int. Cl.
*G01N 1/24* (2006.01)
*G01N 1/20* (2006.01)
(Continued)

(52) U.S. Cl.
CPC ............... *G01N 1/24* (2013.01); *G01N 1/10* (2013.01); *G01N 1/14* (2013.01); *G01N 1/2035* (2013.01); *G01N 1/22* (2013.01)

(58) Field of Classification Search
CPC .......... G01N 1/14; G01N 1/24; G01N 1/2035; G01N 1/10; G01N 1/22
(Continued)

(56) References Cited

U.S. PATENT DOCUMENTS 3,245,269 A * 4/1966 Ivie ................. G01N 30/82
74/3.54
3,446,600 A * 5/1969 Eckstein ............... G01N 1/24
422/88

(Continued)

FOREIGN PATENT DOCUMENTS

EP    2802858 A1 * 11/2014  ............ G05D 22/02
EP    2802858 B1    5/2020
(Continued)

OTHER PUBLICATIONS

International Search Report and Written Opinion; Appl. No. PCT/US2020/070168; dated Sep. 28, 2020; 14 pages.

*Primary Examiner* — Clayton E. LaBalle
*Assistant Examiner* — Kevin C Butler
(74) *Attorney, Agent, or Firm* — Abbey A. Lopez

(57) ABSTRACT

An air sampling device is provided. The air sampling device has a housing with an air inlet and an air outlet, an air pump in gaseous communication with the air inlet and air outlet, and a carrier having a first face and a second opposing face. The carrier includes a plurality of receptacles disposed in a circumferential pattern and configured to receive a sample tube. The device includes a first plate disposed adjacent to and substantially covering the first face of the carrier, wherein the first plate comprises a first sample opening. The device includes a second plate disposed adjacent to and substantially covering the second face of the carrier. The second plate comprises a second sample opening that is circumferentially aligned with the first sample opening to define a circumferential sample position. The device intermittently indexes a receptacle of the carrier into the circumferential sample position. The device includes a plurality of seals to form an air-tight seal in the receptacles in the circumferential sample position.

20 Claims, 13 Drawing Sheets

(51) Int. Cl.
*G01N 1/22* (2006.01)
*G01N 1/14* (2006.01)
*G01N 1/10* (2006.01)

(58) Field of Classification Search
USPC ..................................................... 73/864.34
See application file for complete search history.

(56) References Cited

U.S. PATENT DOCUMENTS

| | | | | |
|---|---|---|---|---|
| 3,564,264 A * | 2/1971 | Karuhn | ................ | G06M 1/101 |
| | | | | 250/574 |
| 4,080,832 A * | 3/1978 | Moody | ................ | G01N 1/2273 |
| | | | | 73/863.23 |
| 4,287,763 A * | 9/1981 | Richard | ................ | G01N 1/405 |
| | | | | 73/170.29 |
| 4,576,054 A * | 3/1986 | Lalin | ...................... | G05D 7/03 |
| | | | | 73/863.03 |
| 4,795,612 A * | 1/1989 | Keller | ................ | G01N 1/2214 |
| | | | | 250/328 |
| 4,869,117 A * | 9/1989 | McAndless | ......... | G01N 1/2214 |
| | | | | 73/864.34 |
| 5,119,682 A * | 6/1992 | Bellinger | ............ | G01N 1/2202 |
| | | | | 73/864.73 |
| 5,437,198 A * | 8/1995 | John | ................... | G01N 1/2208 |
| | | | | 73/863.22 |
| 5,753,832 A * | 5/1998 | Bromberg | ........... | G01N 1/2205 |
| | | | | 73/864.24 |
| 6,167,767 B1 * | 1/2001 | Mengel | ............... | G01N 1/2273 |
| | | | | 73/863.01 |
| 6,477,906 B1 * | 11/2002 | Peterson | ................ | G01N 1/26 |
| | | | | 73/31.02 |
| 6,565,811 B1 * | 5/2003 | Zaromb | ............... | G01N 1/2205 |
| | | | | 422/69 |
| 6,790,674 B2 * | 9/2004 | Wright | ................... | F04B 43/00 |
| | | | | 141/130 |
| 7,159,475 B2 * | 1/2007 | Casillas | .................. | G01N 1/22 |
| | | | | 73/864.34 |
| 7,261,008 B2 * | 8/2007 | Saaski | ................. | G01N 1/2273 |
| | | | | 73/863.22 |
| 10,775,354 B2 * | 9/2020 | Hansen | .................. | G01N 30/06 |
| 2003/0226391 A1 * | 12/2003 | Sanderson | ........... | G01N 1/2208 |
| | | | | 73/1.36 |
| 2004/0194561 A1 * | 10/2004 | Aicher | ................. | G01N 1/2226 |
| | | | | 73/864 |
| 2005/0226777 A1 * | 10/2005 | Bowers | .................... | G01N 1/14 |
| | | | | 422/501 |
| 2009/0007704 A1 * | 1/2009 | Bowers | .................... | G01N 1/14 |
| | | | | 73/864.34 |
| 2014/0096624 A1 * | 4/2014 | ElNaggar | ............... | G01N 1/14 |
| | | | | 73/864.34 |
| 2016/0054204 A1 * | 2/2016 | David | ............... | G01N 33/0036 |
| | | | | 73/863.23 |
| 2017/0299478 A1 * | 10/2017 | David | ............ | G01N 33/0036 |
| 2017/0328815 A1 * | 11/2017 | David | .................... | G01N 1/405 |
| 2020/0408649 A1 * | 12/2020 | Readnour-Gouge | | ......................... G01N 1/2273 |

FOREIGN PATENT DOCUMENTS

| | | | | |
|---|---|---|---|---|
| WO | 2018102116 A1 | 6/2018 | | |
| WO | WO-2018102116 A1 * | 6/2018 | ........... | G01N 1/2273 |

* cited by examiner

PORTABLE AUTOMATIC AIR SAMPLING DEVICE AND METHOD OF COLLECTING AIR SAMPLES THEREFROM

FIELD

The present disclosure is directed to a portable, automatic air sampling device and method of automatically collecting air samples therefrom.

BACKGROUND

Bench-top air, laboratory-scale, collection devices and portable air collection devices exist for sampling particles in the air. The collected air samples are then analyzed in an analytical measurement device, such as a gas chromatography device, to detect the presence and/or concentration of particles in the air. A reliable and easy-to-use portable air collection device may be small, relative lightweight, able to collect a large number of samples over various time points that may span days or weeks, able to collect samples of various different particles in the air, produce uncontaminated samples from a discrete timepoint, provide automated sampling and data logging, offer easy and affordable maintenance, all while also being available at an affordable price. Portable air collection devices often fail to meet one or more of these desired characteristics. As a result, there is a continuing need for an improved, portable and automatic air collection device.

SUMMARY

"Combinations:"

A. An air sampling device comprising:
a housing comprising an air inlet and an air outlet;
an air pump in gaseous communication with the air inlet and air outlet;
a carrier having a first face and a second opposing face, the carrier comprising a plurality of receptacles disposed in a circumferential pattern, wherein each receptacle is configured to receive a sample tube, and wherein each receptacle comprises a first end and an opposing second end;
a first plate disposed adjacent to and substantially covering the first face of the carrier, wherein the first plate comprises a first sample opening;
a second plate disposed adjacent to and substantially covering the second face of the carrier, wherein the second plate comprises a second sample opening that is circumferentially aligned with the first sample opening relative to the receptacles of the carrier, wherein the circumferential position of the first and second sample openings defines a circumferential sample position, wherein the carrier is rotatable relative to the first and second base plates or the first and second base plates are rotatable relative to the carrier to intermittently index a receptacle into the circumferential sample position;
a gaseous path that extends from the air inlet, through the first sample opening, through the receptacle in the circumferential sample position, through the second sample opening, through the air pump, and out the air outlet; and
a first seal disposed between the first end of each receptacle and the first plate at the circumferential sample position, a plurality of second seals disposed in the first end of each receptacle, and a third seal disposed between the second end of each receptacle and the second plate at the circumferential sample position.

B. The device according to Paragraph A further comprising a motor operatively connected with a bearing, wherein the bearing is operatively connected with and configured to rotate the carrier relative to the first and second base plates.

C. The device according to Paragraph A or Paragraph B further comprising a purge line extending from the air inlet in the housing through the air pump and out the air outlet of the housing.

D. The device according to any of Paragraphs A through C, wherein the air flow path includes a first valve disposed upstream of the first plate and a second valve disposed downstream of the second plate to control air flow to the carrier.

E. The device according to Paragraph D, wherein the first and second valves are solenoid valves.

F. The device according to any of Paragraphs A through E further comprising sample tubes disposed in the receptacles, wherein the sample tubes are free of caps.

G. The device according to any of Paragraphs A through F, wherein the first, second, and third seals comprise o-rings.

H. The device according to any of Paragraphs A through G, wherein the air pump is configured to generate air flow in the range of 0.02 L/min to 20 L/min.

I. The device according to any of Paragraphs A through H, wherein back pressure in the air flow path is less than 7 psi.

J. The device according to any of Paragraphs A through I, wherein the sample tubes are substantially cylindrical.

K. The device of any of Paragraphs A through J, wherein the plurality of receptacles are disposed in at least two circumferential rows on the carrier.

L. A method of collecting an air sample, the method comprising the steps of:
providing a housing having an air inlet and an air outlet;
providing a carrier disposed in the housing, the carrier comprising a plurality of receptacles arranged in a circumferential pattern on the carrier, wherein each receptacle has a first end and a second opposing end, wherein the carrier intermittently indexes the receptacles into a circumferential sample position;
inserting sample tubes into two or more of the plurality of receptacles;
initiating a program to collect air samples in the sample tubes at predetermined times or at predetermined time intervals;
opening the first and second valves to complete an air flow path, wherein the air flow path begins at the air inlet, flows through a first sample tube in the circumferential sample position, and out the air outlet;
sealing the receptacles and sample tubes in the circumferential sample position from air outside of the air flow path;
generating air flow through the air flow path at a first predetermined rate between 0.02 L/min and 20 L/min to collect a first air sample in the first sample tube for a predetermined amount of time;
closing the first and second valves;
incrementally rotating the carrier to dispose a second sample tube in the circumferential sample position;
opening the first and second valves to complete the air flow path through the second sample tube;
sealing the receptacles and sample tubes in the circumferential sample position from air outside of the air flow path;

generating air flow through the air flow path at a second predetermined rate between 0.02 L/min and 20 L/min to collect a second air sample in the second sample tube;

closing the first and second valves; and removing the carrier from the housing.

M. The method according to Paragraph L further comprising the step of directing air from the air inlet directly to the air pump and out the air outlet to purge air in the air flow path.

N. The method according to Paragraph L or Paragraph M further comprising the step of measuring and recording the air flow rate, temperature of the air, and/or relative humidity of the air during the step of generating air flow through the air flow path at a predetermined rate between 0.02 L/min and 20 L/min to collect a first air sample in the first sample tube for a predetermined amount of time.

O. The method according to any of Paragraphs L through N, wherein the first predetermined rate is different than the second predetermined rate.

P. The method according to any of Paragraphs L through O further comprising the step of:

providing:
- a first plate disposed adjacent to and substantially covering a first face of the carrier, wherein the first plate comprises a first sample opening;
- a second plate disposed adjacent to and substantially covering a second opposing face of the carrier, wherein the second plate comprises a second sample opening that is circumferentially aligned with the first sample opening relative to the receptacles of the carrier, wherein the circumferential position of the first and second sample openings defines the circumferential sample position;
- a first seal disposed between the first end of the receptacles and the first plate in the circumferential sample position;
- a plurality of second seals disposed in the first end of the receptacle; and
- a third seal disposed between the second end of the receptacles and the second plate in the circumferential sample position.

DETAILED DESCRIPTION

The present invention is directed to a portable and automated air collection device. The device includes a carousel for holding sample tubes, an air pump for pulling air through the carousel to collect a sample, and a housing for containing the various elements of the device. The housing includes an air inlet for taking in an air sample and an air outlet for discharging a portion of the air received in the air inlet housing. The housing is relatively small and lightweight, making it portable. The carousel is in gaseous communication with the air inlet and air outlet. The carousel includes a carrier having a plurality of receptacles for receiving sample tubes. The carousel allows for automatic sampling and collection of a plurality of samples. The carousel includes first plate that substantially covers a first face of the carrier and a second plate that substantially covers a second opposing face of the carrier to seal each of the sample tubes that are not in the sample position. A first opening in the first plate and a second opening in the second plate form part of an air flow path that begins in the air inlet, enters the first opening, flows through one of the sample tubes in the carrier, out the second opening, through the air pump, and out the air outlet of the housing.

Figure 1:
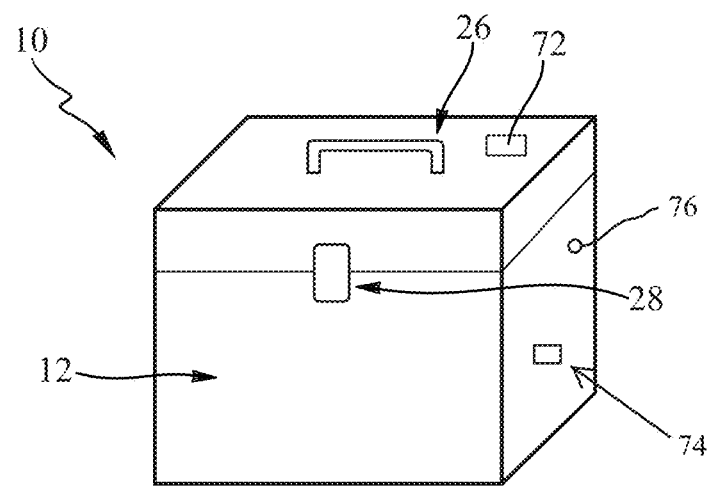
FIG. 1 is a perspective view of an air collection device of the present invention.
Figure 2:
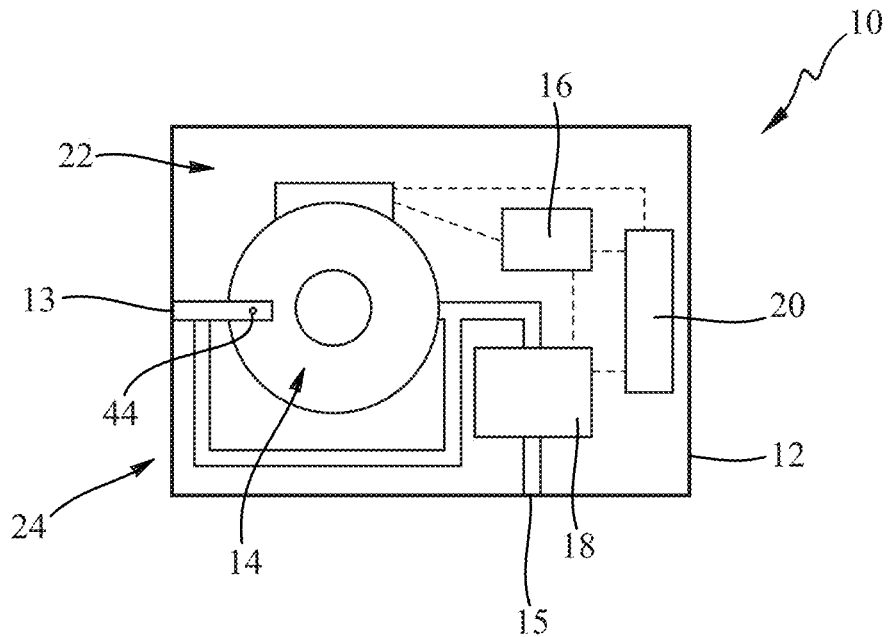
FIG. 2 is a top, plan view of the interior of the housing of the air collection device of FIG. 1.

With reference to FIGS. 1 and 2, the device 10 includes a housing 12, a carousel 14, a motor 16 for driving rotation of the carousel 14, an air pump 18 for pulling air through sample tubes in the carousel 14, and a power source 20. The housing 12 has an air inlet 13 and an air outlet 15.

The housing defines an interior 22 and an exterior 24. The housing may be constructed of various materials, including, for example, metal, wood, plastic, and combinations thereof. The housing may include additional components to improve the portability of the device, including one or more handles 26, telescoping handles, latches 28, rollers, and the like. In order to maximize the portability of the device, the housing may have a maximum volume of 0.05 m$^3$, or up to 0.01 m$^3$. The device may be configured to have a maximum weight of 20 kg, or 10 kg, or 8 kg. An exemplary housing includes a case available from the Pelican Products, Inc. The smaller and lighter the device, the greater the portability.

With reference to FIGS. 2-6, the carousel 14 is disposed in the interior 22 of the housing 12. The carousel 14 includes a carrier 30 having a first face 32 and an opposing second face 34. The carousel 14 includes a first plate 36 disposed adjacent to and covering substantially all of the first face 32 of the carrier 30 and a second plate 38 disposed adjacent to and covering substantially all of the second face 34. The first plate 36 includes a first sample opening 40 and the second plate 38 includes a second sample opening 42 that is circumferentially aligned with the first sample opening 40 to define a circumferential sample position 44.

Figure 4:
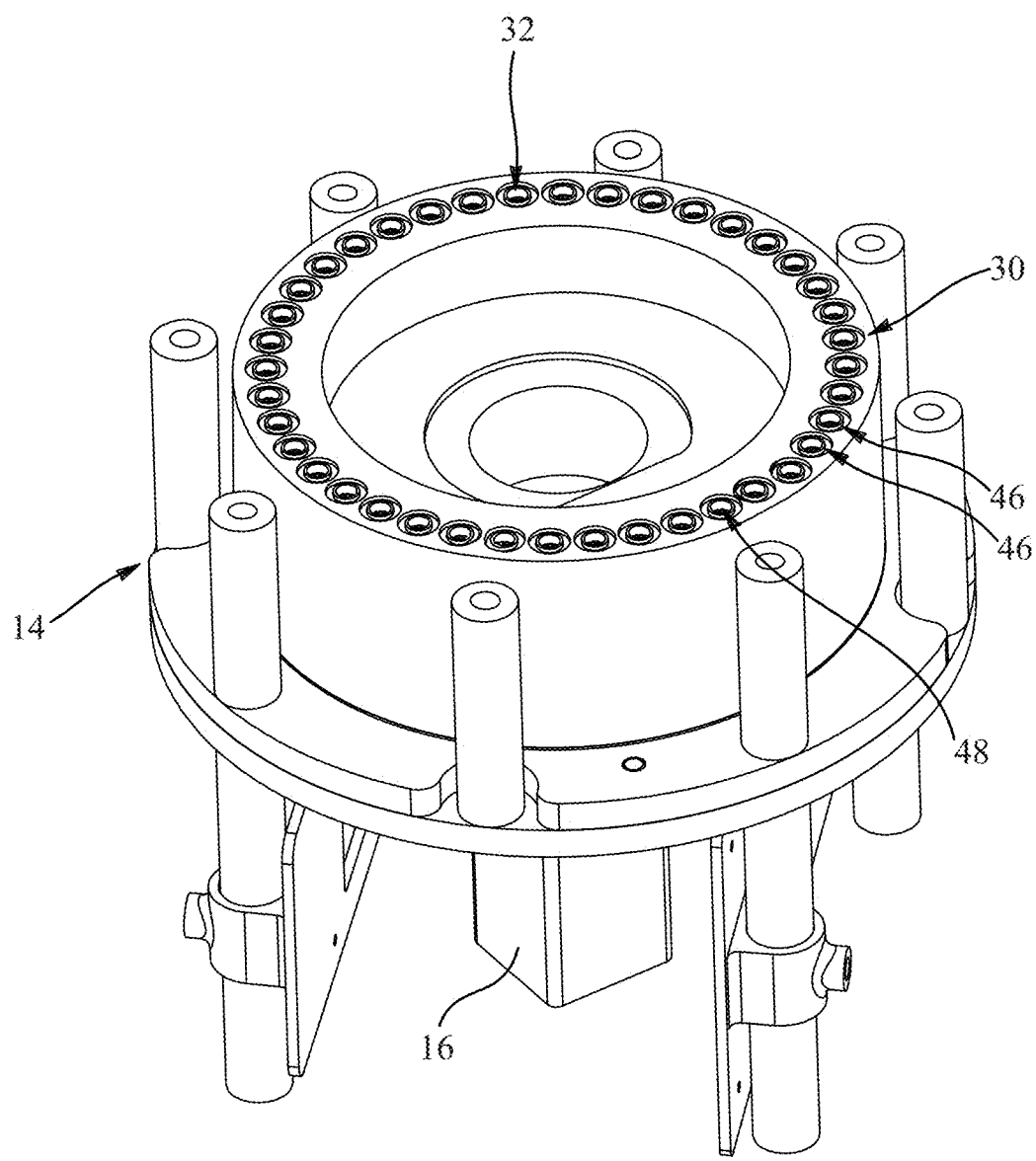
FIG. 4 is a perspective view of a portion of a carousel with a first plate removed to illustrate details of a carrier.
Figure 5:
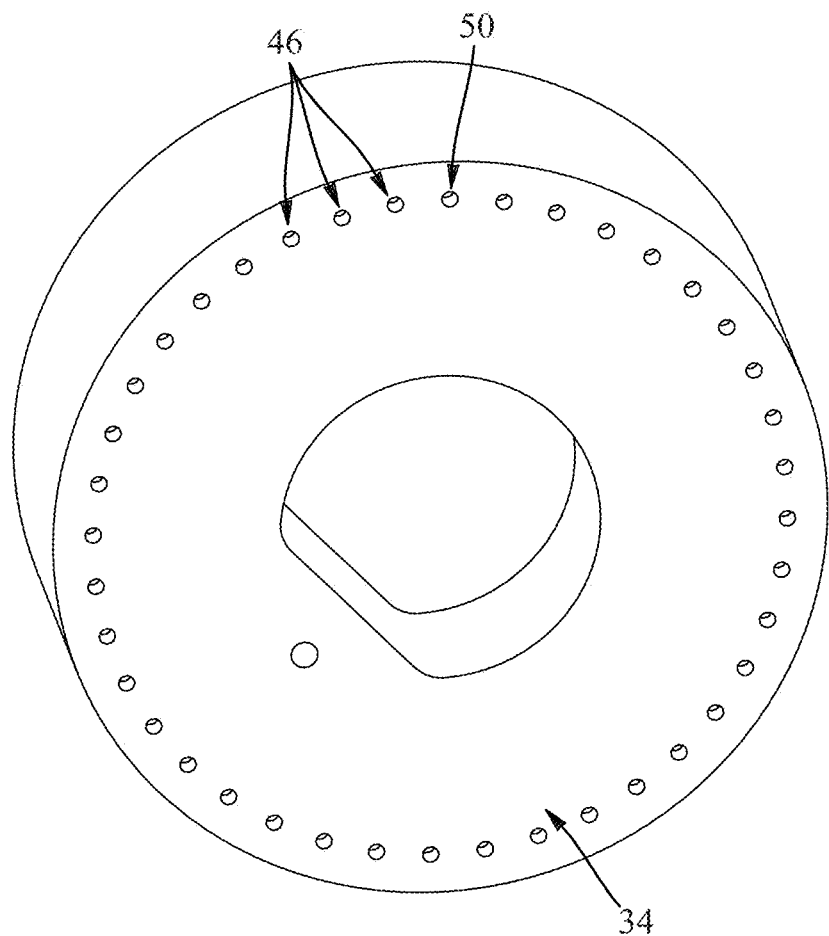
FIG. 5 is a perspective view of a carrier of an air collection device.
Figure 7:
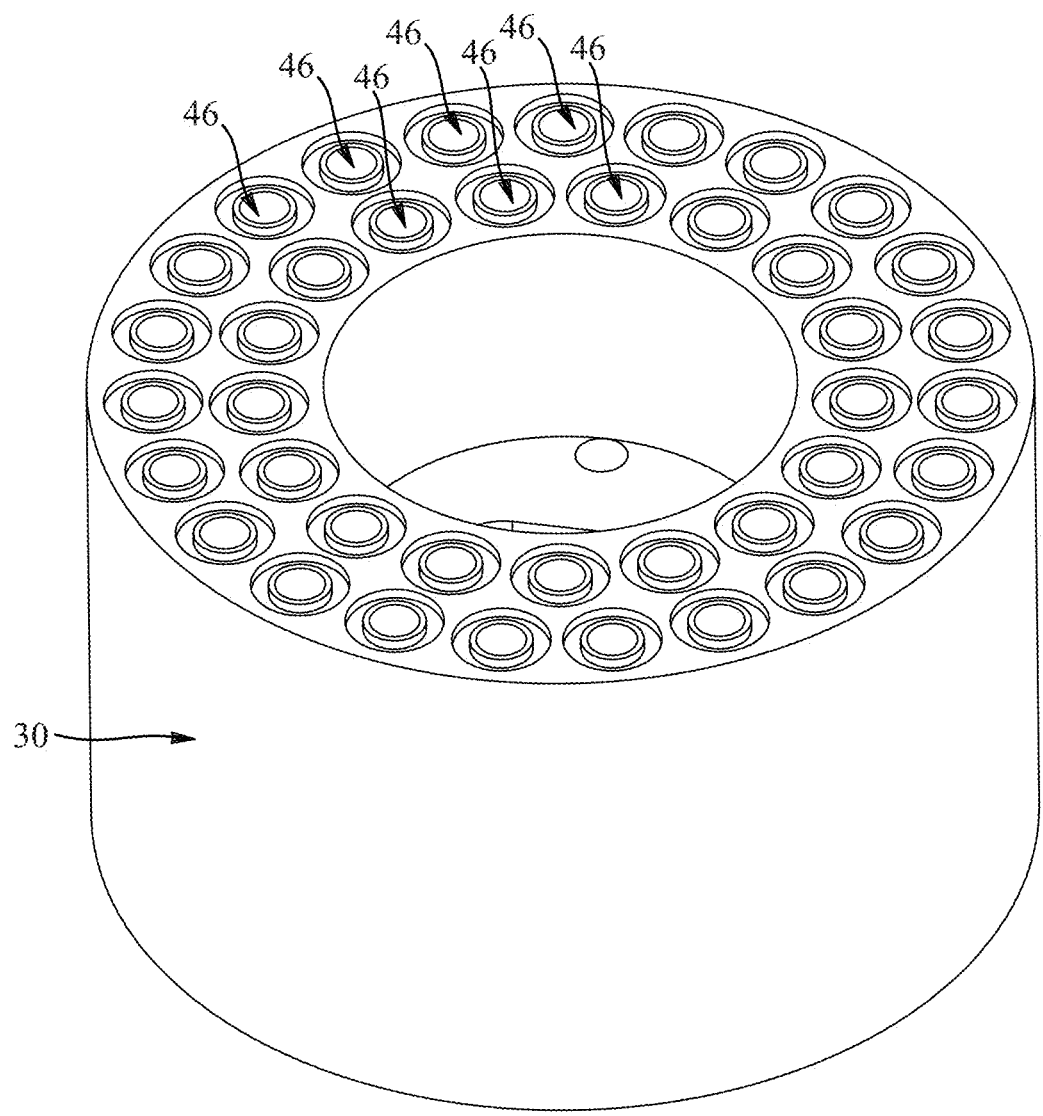
FIG. 7 is a perspective view of a carrier of an air collection device.
Figure 8:
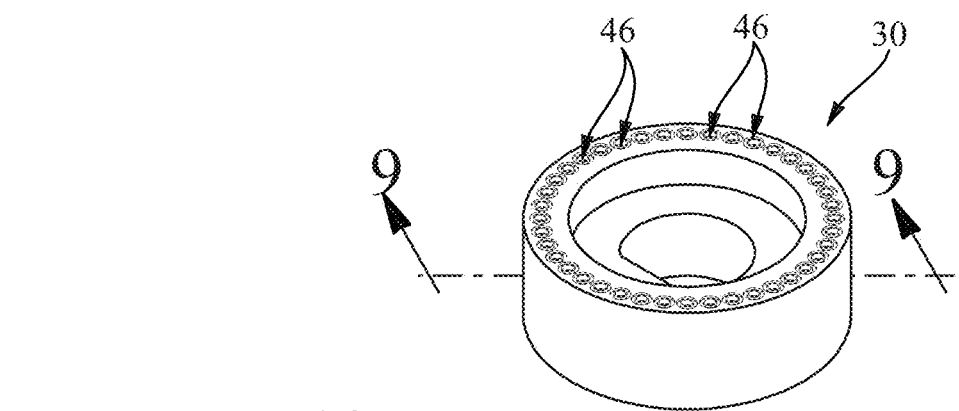
FIG. 8 is a perspective view of a carrier of an air collection device.
Figure 9:
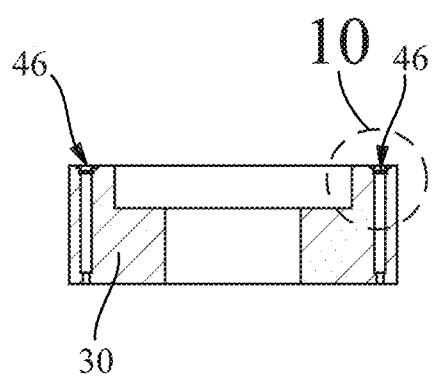
FIG. 9 is a sectional view of the carrier of FIG. 8 taken along lines 9-9.

With reference to FIGS. 4 and 5, the carrier includes a plurality of receptacles 46 spaced in a circumferential pattern around the carrier. Each receptacle 46 includes a first end 48 and an opposing second end 50. The receptacles 46 are sized and shaped to contain a sample tube. The carrier 30 may have a cylindrical shape such that the receptacles 46 are spaced around the circumference of the cylindrical carrier 30. Or, the carrier 30 may have various different shapes. The carrier may comprise at least 20, or at least 30, or at least 40 receptacles. The receptacles 46 may be disposed in a single row such as shown in FIGS. 4 and 5, or the receptacles 46 may be disposed in multiple rows, such as shown in FIG. 7, to increase the number of receptacles 46 in the carrier 30 and/or to reduce the size of the carrier 30.

Figure 3:
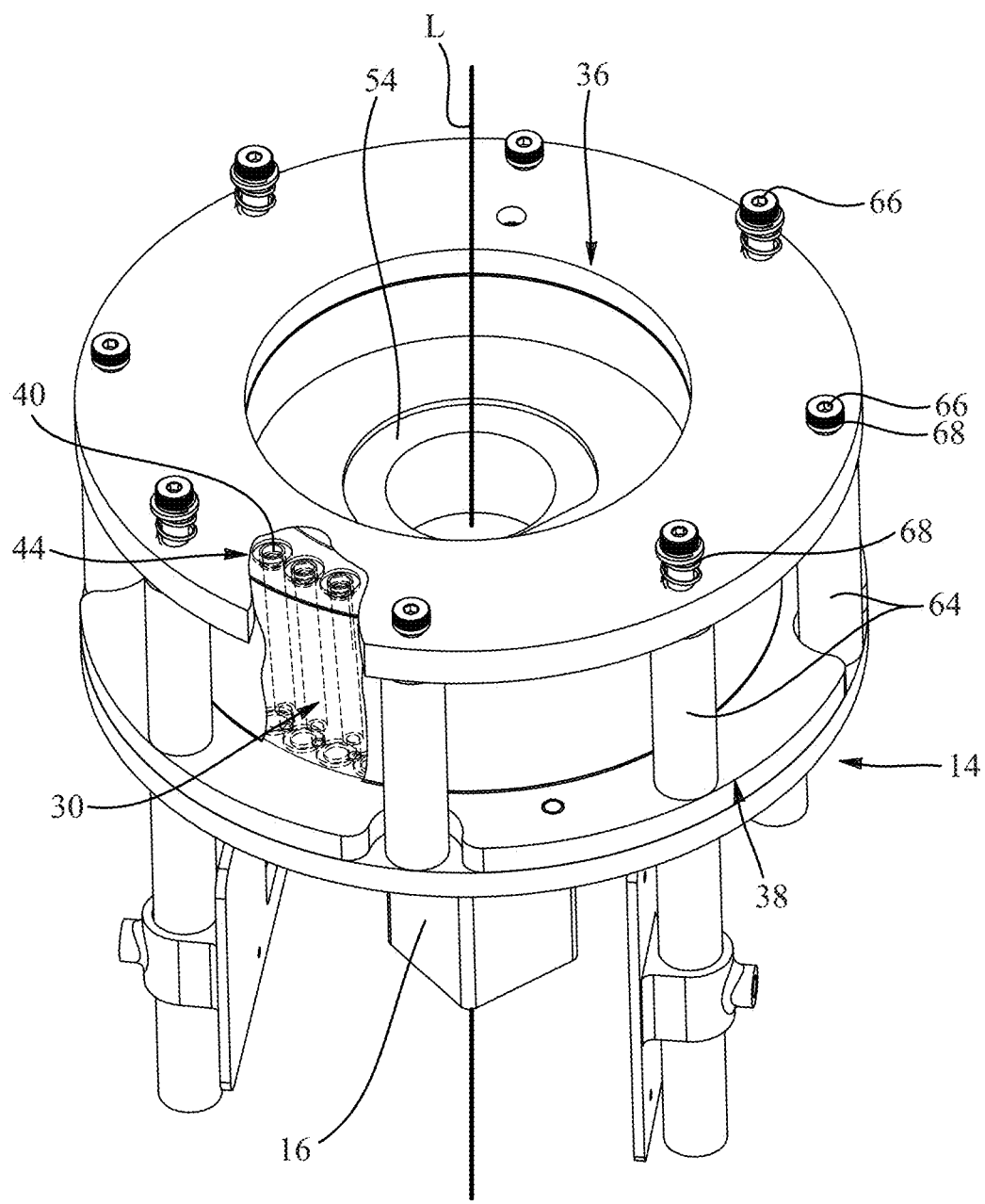
FIG. 3 is a perspective view of a carousel of an air collection device.

With reference to FIG. 3, the first and second plates 36 and 38, respectively, may be configured in a variety of shapes. For example, the first and second plates 36 and 38 may have a circular or arcuate shape. The first and second plates 36 and 38 may also be configured in other shapes, such as square, rectangular, or arcuate. The first and second plates 36 and 38 may be comprised of various materials, including metal, plastic, and the like.

With reference to FIGS. 2 and 3, the carousel 14 includes a motor 16 that rotates a bearing 54 about a longitudinal axis L. The bearing 54 is operatively joined with the carrier 30 or the first and second plates 36 and 38 to cause rotation of either the carrier 30 or the first and second plates 36 and 38 while the other component remains stationary relative to the housing 12. For example, with reference to FIGS. 2 and 3, the bearing 54 may be operatively connected with the carrier 30 to cause the carrier 30 to rotationally index about the longitudinal axis L relative to the stationary first and second plates 36 and 38. Or, the carousel 14 may be configured such that one or more bearings 54 are operatively connected with the first and second plates 36 and 38 to cause the first and second plates 36 and 38 to rotationally index about the longitudinal axis L relative to the stationary carrier 30. Rotation of the carrier or the first and second plates intermittently indexes each of the receptacles of the carrier in gaseous communication with the first and second sample openings of the first and second plates, respectively, to independently collect an air sample in a sample tube from the receptacle in the circumferential sample position.

The motor 16 may be configured in various different ways. For example, a stepper motor may be used to cause the intermittent indexing of the carrier or the first and second plates. An exemplary stepper motor is available from Anaheim Automation (Motor: 17Y101S-LW4; Gear Head: GBPN-0403-256-AA171-197; Driver: MBC25081 TB). The gear of the motor may include a gear box or a timing pulley and belt system.

Figure 6:
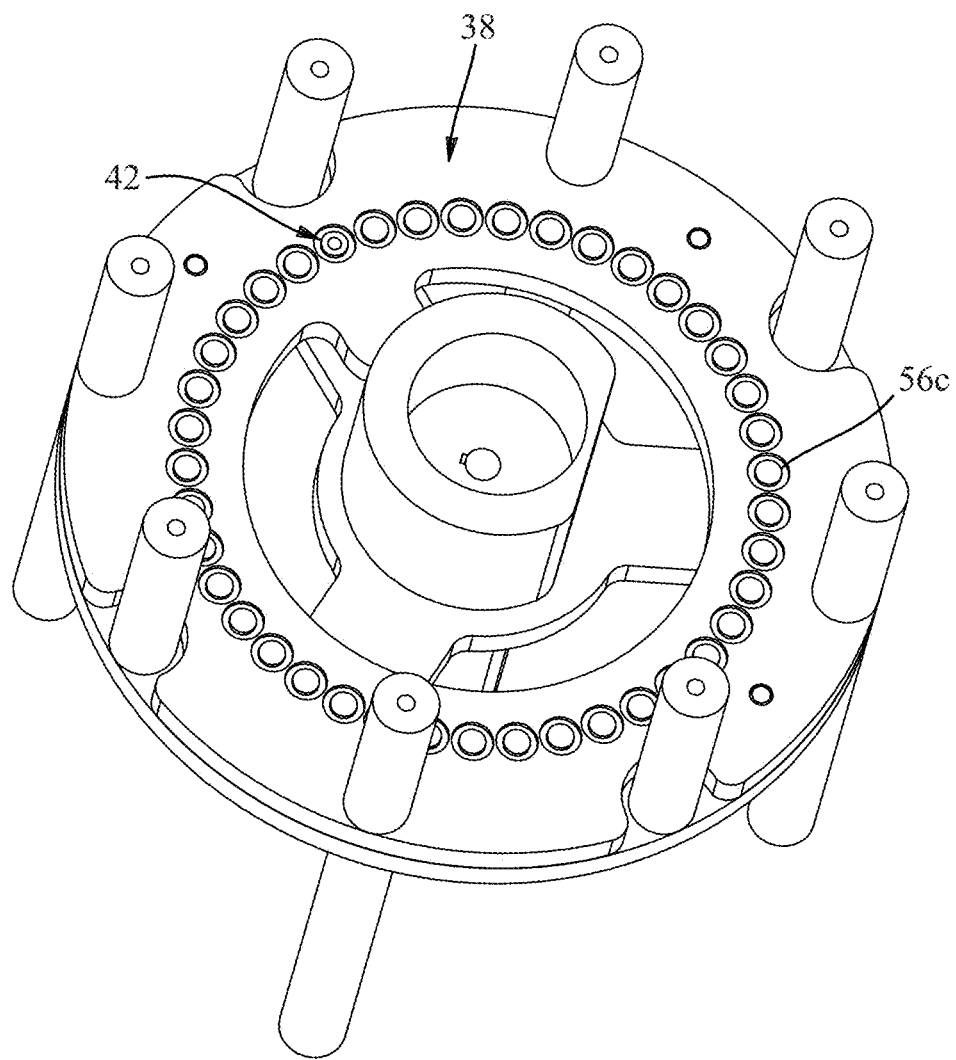
FIG. 6 is a perspective view of a carousel with components removed to illustrate details of a second plate.

The carousel 14 includes a plurality of seals configured to seal the sample tubes from air in the environment. The seals may be disposed on the carrier and/or on the first and second plates. With reference to FIGS. 3, 6, and 8-10, the device may include seals 56 may be disposed circumferentially around the carousel to form air-tight seals between the first plate 36 and the first end 48 of each of the receptacles 46 and the second plate 38 and the second end 50 of each the receptacles 46. The carrier 30 may also include a plurality of seals 56, each disposed in the receptacles 46 to form an air tight-seal between each of the sample tubes 60 and the receptacles 46. With reference to FIGS. 3, 6, and 11, the receptacle 46 located in the circumferential sample position 44 is disposed in an air flow path that begins at the air inlet 13 of the housing 12, passes through the first sample opening 40, through the sample tube 60 in the receptacle 46 in the circumferential sample position 44, and then out the second sample opening 42, through the air pump 18, and out the air outlet 15 of the housing 12. The receptacle 46 located in the circumferential sample position 44 is also sealed so as to only allow air flowing through the air flow path to enter the sample tube.

Figure 10:
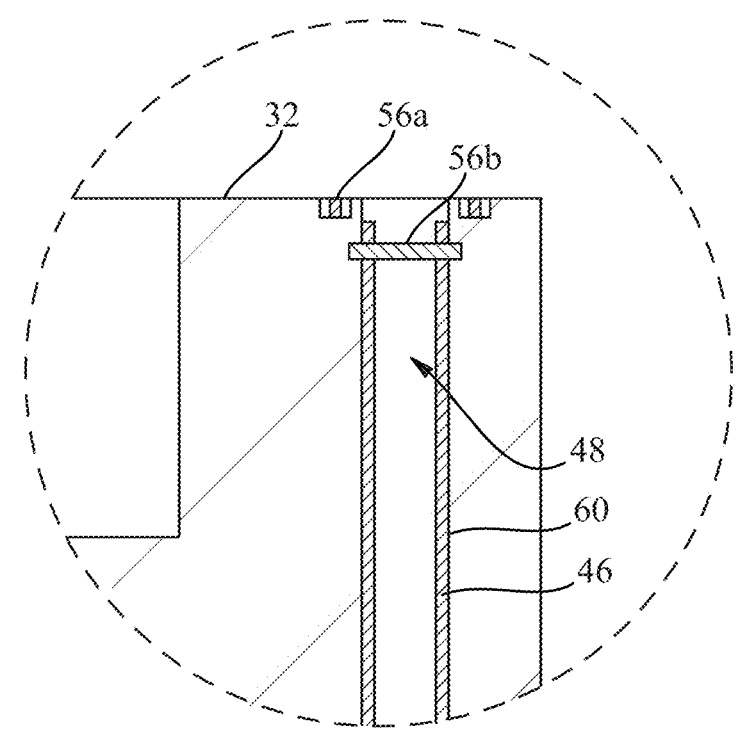
FIG. 10 is an exploded view of portion 10 of FIG. 9.
Figure 11:
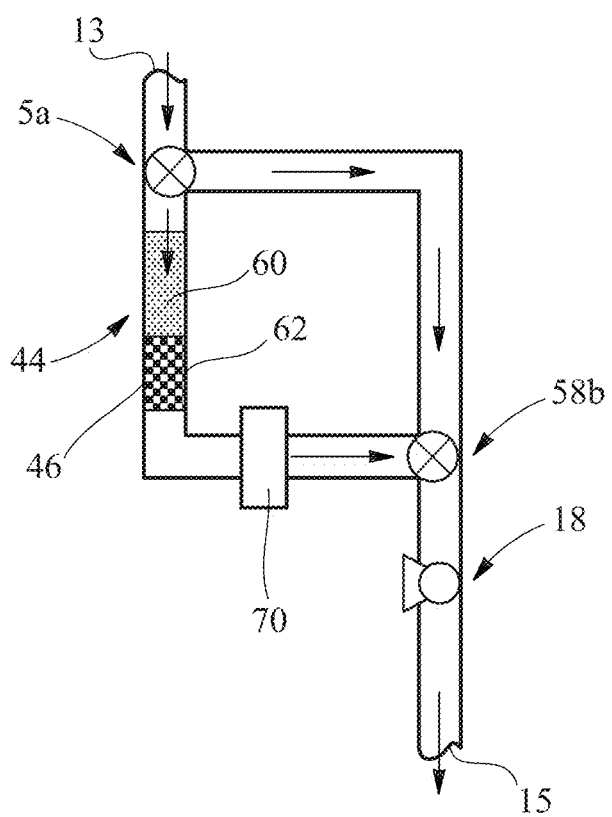
FIG. 11 is an air flow path through an air collection device of the present invention.

With reference to FIG. 10, the carousel may include a plurality of first seals 56a disposed on the first face 32 of the carrier 30 adjacent to the first end 48 of the receptacles 46. With reference to FIGS. 3 and 10, the first seals 56a may form an air-tight seal between the first plate 36 and the first end 48 of each receptacle 46. The carrier 30 may include a plurality of second seals 56b disposed in the first end 48 of each receptacle 46. The second seals 56b may form an air-tight seal between the receptacle 46 and the sample tube 60 to prevent air from passing between a gap separating the receptacle and sample tube. With reference to FIG. 6, the carrier 30 may include a plurality of third seals 56c disposed on the second plate 38 in the same circular spaced pattern as the first seals 56a on the first face 32 of the carrier 30. The third seals 56c are configured to align with the second end 50 of the receptacles 46 to form an air-tight seal between the second plate 38 and the second end 50 of each receptacle 46.

The seals 56 may be configured in various ways, such as o-rings or gaskets. The seals may be composed of natural or synthetic rubber, polytetrafluoroethylene, neoprene, polyurethane, nitrile, fluorocarbon, combinations thereof, and the like. One or more of the seals 56 may be a tapper seal. One device may have all the same type of seals 56, or different types of 56 may be used in combination in one device.

The seals of the present invention eliminate the need for caps to be placed on the sample tubes after an air sample is collected. The seals prevent contamination of the sample tubes while the sample tubes remain in the carrier and sealed by the seals and the first and second plates. Once the sample tubes are going to be removed from the carrier and placed in an analytical device such as a gas chromatography machine, care should be used to limit the amount of time the sample tubes are exposed to air during the transfer. So long as the transfer time is short, contamination may be prevented or minimal. This is because time and air flow are needed to cause enough surface area contact between the air and sorbent material for the sorbent material to absorb particles from the air during transfer. End caps may be applied to the sample tubes after removal from the carrier, if additional time will elapse before the samples are analyzed.

With reference to FIG. 3, the first and second plates 36 and 38 may be joined together with a plurality of risers 64. The risers 64 may extend from the first plate 36 to the second plate 38. The risers 64 may be secured with the first and/or second plates 36 and 38 with screws 66. The screws 66 may be spring-loaded with spring(s) 68 in order to control the amount of pressure applied to the seals 56 between the first and second plates 36 and 38 and the carrier 30.

Figure 12:
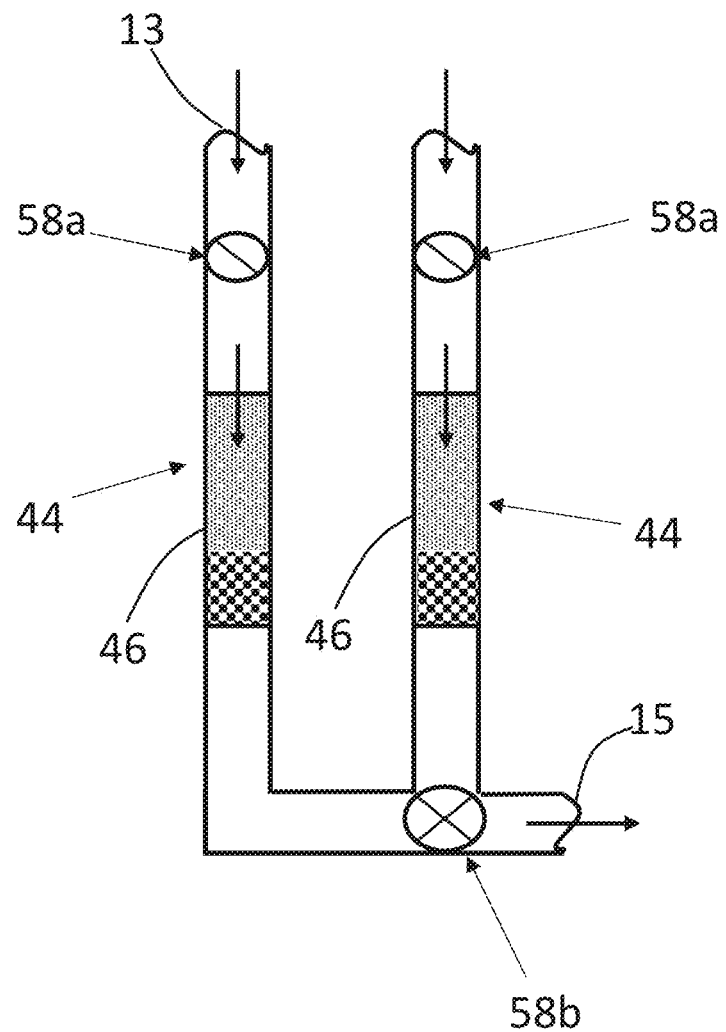
FIG. 12 is an air flow path through an air collection device of the present invention.
Figure 13:
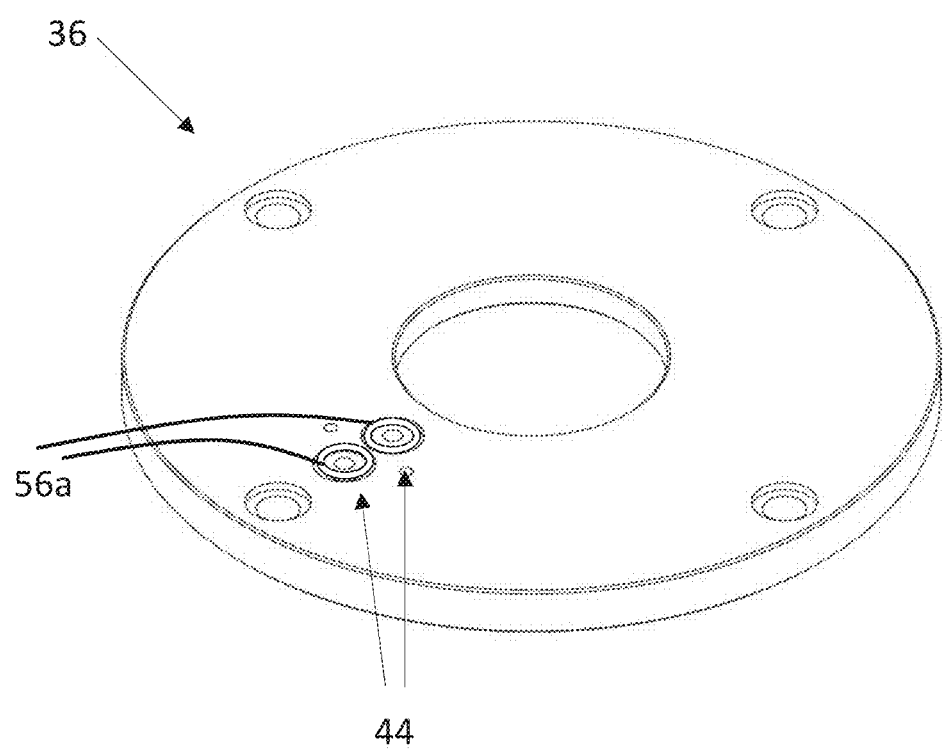
FIG. 13 is a perspective view of a top plate of a carousel.
Figure 14:
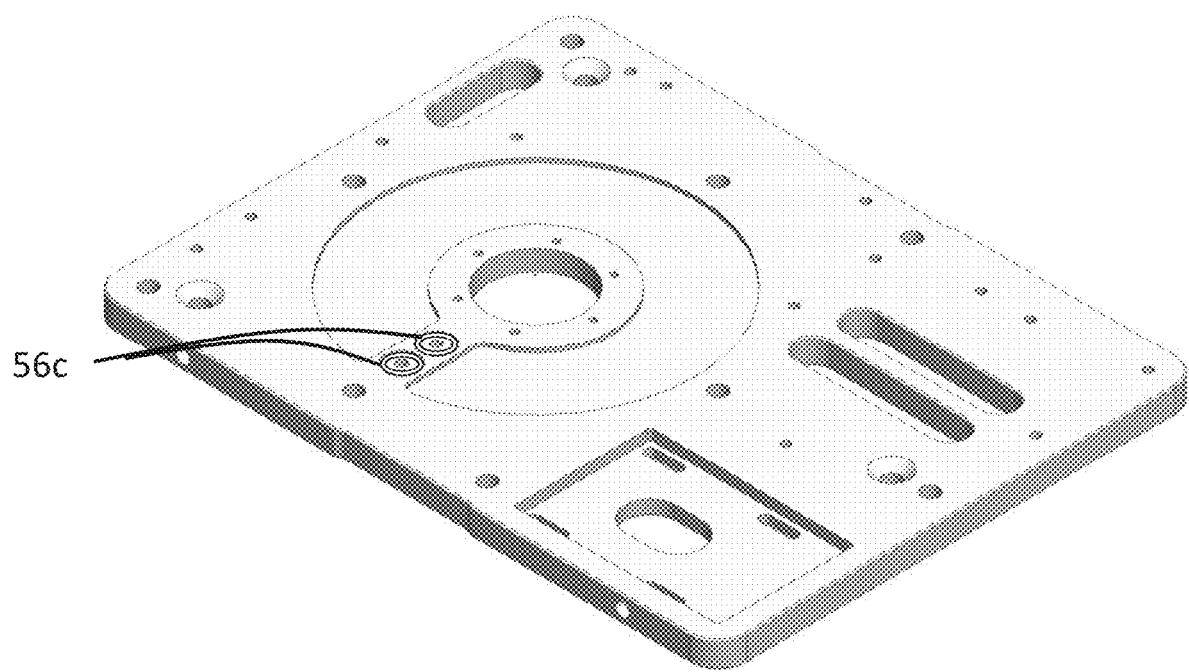
FIG. 14 is a perspective view of a bottom plate of a carousel.
Figure 15:
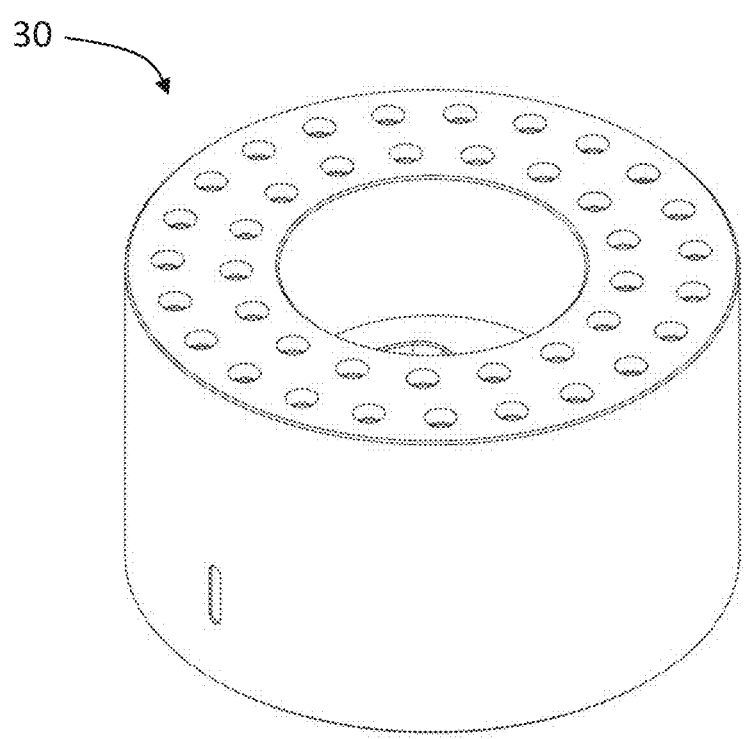
FIG. 15 is a perspective view of a carrier of a carousel.
Figure 16:
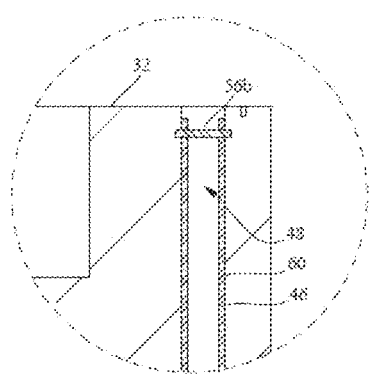
FIG. 16 is a partial exploded, sectional view of a carrier having seals disposed in receptacles.

With reference to FIGS. 11 and 12, the sample tubes 60 include a sorbent material 62. The sorbent material traps particles from the collected air. After collection, the sample tubes may be placed in a chemical analyzer to extract and identify the collected particles from the air sample. The tubes may be made of glass or other material that has a low air permeability rate. Commercially available sample tubes may be used. The sample tubes may be substantially cylindrical in shape and may have two ends that are open to the environment.

The sorbent material may be selected based upon the type and size of particle that is expected to be trapped by the sorbent material during sampling. The sorbent material may be selected from the group consisting of: activated charcoal, silica gel, and organic porous polymers such as Tenax and Amberlite XAD resins. The sorbent material is intended to trap and retain particles in the sorbent tube for later analysis.

The device includes an air pump 18 to pull air through the receptacles. It may be desirable for the air pump to be operable over a wide range of air flow rates. Smaller air flow rates are better suited to capture smaller particles in the sorbent material, whereas higher air flow rates are better suited to capture larger particles in the sorbent material. In order to establish high air flow rates through the air flow path, back pressure may be minimized in the air flow path. Back pressure can be reduced by minimizing or eliminating changes in the flow path, including changes to the cross-sectional shape and size and number of turns. The device may be able to handle back pressure up to 7 pounds per square inch (psi), or up to 6.5 psi.

The air pump may be capable of generating an air flow rate in the range of 0.02 liters per minute (L/min) to 20 L/min, or up to 40 L/min. The air pump may be programmed to operate at different, user-selected air flow rates within the operating range. As discussed above, different air flow rates may provide better absorption of different size particles into the sorbent material. An exemplary air pump is the GilAir Plus Personal Air Sampling Pump, from Sensidyne, LP.

With reference to FIGS. 11 and 12, the device may include valves 58 to open and close access to the receptacle in the circumferential sample position 44. The valves 58 may open to take an air sample and may close to seal the receptacle between samples. The device 10 may include at least a first valve 58a located upstream of the sample tube in the circumferential sample position and a second valve 58b located downstream of the sample tube in the circumferential sample position. The valves may be solenoid valves, such as the LFV solenoid available from the Lee Company. Other types of valves may also be used.

With reference to FIG. 11, the device 10 may include a purge system to prevent contamination of the system with air that remains in the air flow path from a previous sample. For example, a first valve 58a may be configured as a 3-way valve to either prevent the flow of air from passing downstream, to direct the air flow through the sample tube in the circumferential sample position, or to direct the air through a purge line. The purge line bypasses the carousel and directs a portion of air to the air outlet 15 in the housing 12. The second valve 58b may also be a 3-way valve to either prevent the flow of air from passing downstream, to open the air flow line from the sample tube in the circumferential sample position to the air outlet, or to open the air flow line from the purge line to the air outlet.

With reference to FIG. 12, potential contamination in the air flow path may be so minimal that a purge system may not be needed. For example, where the air flow path from the air inlet to the sample tube occupies a sufficiently small volume, the need to purge air in the air flow path may be diminished or even eliminated, as the air in the air flow path will have a little to no impact on the results of the sample. Where a purge system is not present, the first valves 58a upstream of the sample tubes may be 2-way valves instead of 3-way valves illustrated in FIG. 11. The first valves 58a of FIG. 12 control whether an air sample is taken from one of two rows of sample tubes such as illustrated in FIG. 7. The second valve 58b in FIG. 12 may be a 3-way valve to control whether to prevent the flow of air from passing downstream to the air outlet or to open the air flow line to one of the two sample tubes.

Along with minimizing the volume of air in the air flow path from the air inlet to the sample tube, contamination may be minimized by using inert materials in this portion of the air flow path. Inert materials may include materials such as stainless steel, polytetrafluoroethene, glass, and coatings such as polytetrafluoroethene and silcosteel produced through silanization.

With reference to FIGS. 13-16, the device may include seals only in the circumferential sampling position to minimize friction between the carrier and the first and second plates during rotation and/or to minimize the number of seals required. A first seal 56a may be disposed on the first plate 36 in the one or more circumferential sample positions 44 and may form an air-tight seal between the first plate 36 and the carrier 30. Second seals 56b may be disposed in the receptacles 46 to form an air-tight seal between each of the sample tubes 60 and the receptacles 46. A third seal 56c may be disposed on the second plate 38 in the one or more circumferential sample positions 44 and may form an air-tight seal between the second plate 38 and the carrier 30.

The device may include one or more meters and/or sensors. For example, the device may include a flow meter for measuring the air flow rate through the air flow path. The device may include various sensors, including temperature sensors, relative humidity sensors, and the like.

The device includes a control system that controls the operation of the various components of the device operation of the air pump, valves, motor of the carousel, any flow meters or sensors, memory, and the like. The device may be configured with memory to store sampling data such as the air flow rate, the temperature of the air sampled, the relative humidity of the air sampled, the total sample collection time, and the like. The device includes a power source to provide power to the various electrical components of the device, including the motor, air pump, solenoids, and controller. In order to make the device portable, the power source may be a battery.

With reference to FIG. 1, the device 10 may include components that allow the device to be remotely controlled and/or monitored in real time. The device 10 may include a wireless communication module 74. The wireless communication module may utilize 802.11 (Wi-Fi), 802.15.4 (ZigBee, 6LoWPAN, Thread, JennetIP), Bluetooth, combinations thereof, and the like. The wireless communication module may utilize ad hoc Mesh Network protocol. The wireless communication module may send real-time data from the sensors and the control system to the cloud for storage and access. Moreover, the wireless communication module may be used to program and/or adjust the operation of the device.

The device 10 may also include a vent 76 in the housing 12. The vent 76 may prevent pressure from building up in the interior 22 of the housing 12.

Method

In order to prepare the device 10 for collecting air samples, sample tubes 60 may be placed in one or more of the receptacles 46 of the carrier 30. The carrier 30 may then be installed in the carousel 14 by joining the carrier 30 with the first and second plates 36 and 38. As the carrier 30 is joined with the first and second plates 36 and 38, force is applied to create an air tight seal in all of the receptacles 46, except for the receptacle 46 that is aligned with the first and second openings 40 and 42 of the first and second plates 36 and 38 in the circumferential sample position 44.

Along with assembling the components of the device 10, the device 10 may be programmed to collect air samples over certain time intervals or at specific times over a total program period. The total program period may be a day, multiple days, or weeks. Because the receptacles 46 form an air-tight seal with the first and second plates 36 and 38, the sample tubes 60 are safe from contamination and can remain in the carousel 14 for extended periods of time before the sample tubes 60 are removed and analyzed in an analyzer. Once assembled, the device 10 may be placed in a location where the air samples are to be collected. The benefit of the small, lightweight, and portable device 10 is that the device 10 may be placed in various locations throughout a home, an office, a business, or outdoors without affecting the normal use of the space.

With reference to FIGS. 11 and 12, at any time during the operation of the device 10, the device 10 may be in sample mode, purge mode, or standby mode. In sample mode, the first and second valves 58*a* and 58*b* open to a sample position to complete the air flow path from the air inlet 13 in the housing 12, through the first sample opening 40 in the first plate 36, through a sample tube 60 in the receptacle 46 at the circumferential sample position 44, through the second sample opening 42 in the second plate 38, through the air pump 18, and out the air outlet 15 of the housing 12. To collect an air sample, the air pump 18 turns ON, pulling a vacuum to generate air flow through the sample tube 60. As the air flow through the sample tube 60, particles from the air are collected by the sorbent material 62 in the sample tube 60.

With reference to FIGS. 6-10 and 13-16, ss air flow is passing through the sample tube 60 in the receptacle 46 at the circumferential sample position 44, the sample tubes 60 in the circumferential sample position 44 are sealed from air outside of the air flow path.

With reference to FIGS. 6-10, each sample tube 60 and receptacle 46 is sealed by the first, second, and/or third seals 56*a*, 56*b*, and 56*c*. As such, sample tubes 60 that have not received an air sample and sample tubes 60 that have received an air sample are prevented from contamination.

As a sample is collected in the sample tube 60, a flow meter 70 may be used to measure the amount of air flow passing through the sample tube over the total time for the individual sample in order to later measure the concentration of particular particles in the air. A sensor 72 may also measure characteristics of the air, such as temperature and relative humidity. The flowmeter data and sensor data measured during sample mode may be stored in the memory of the device. Once the sample collection is complete, the valves 58 may close to prevent air from entering or exiting the receptacle 46 in the circumferential sample position 44.

In standby mode, the device may be idle with the air pump OFF and the valves 58 closed to prevent air from entering or exiting the receptacle 46 in the circumferential sample position 44. The device 10 may remain in standby mode, until the controller switches the device 10 into sample mode or purge mode.

With reference to FIG. 11, before the device 10 operates in sample mode, the device 10 may be configured to operate in purge mode to clear the air flow path from the air inlet 13 to the first sample opening 40 in the first plate 36. Purging the air in the air flow path ensures that the air collected in a sample tube is air taken the environment at a particular point in time. This may be critical for monitoring changes to the air at the exterior 24 of the housing 12 as a function of operation of another device, such as the operation of an air freshening and/or air purification device. In purge mode, the first and second valves 58*a* and 58*b* open an air path from the air inlet to the air outlet that bypasses the carrier. If an air sample includes air that has been disposed in the air flow path before the sample is collected, the air sample is not providing accurate details of the air (including concentration of particular components and air conditions such as temperature and relative humidity) at a particular point in time.

Before a subsequent sample may be collected in the device 10, the motor 16 incrementally rotates either the carrier 30 or the first and second plates 36 and 38 to position a subsequent sample tube 60 and receptacle 46 into the circumferential sample position 44. The motor 16 incrementally rotates the carrier 30 relative to the first and second plates 36 and 38 to dispose the subsequent sample tube in the circumferential sample position. The process of collecting samples may be repeated for up a number of repetitions equal to or less than the number of sample tubes present in the carrier.

Once collection of air samples is complete, the device may be removed from the sampling location and prepared for analysis. To analyze the samples, the housing may be opened, the first plate disconnected from the carrier, and the carrier may be removed. In order to prevent or minimize contamination of the sample tubes, the sample tubes should be immediately placed in an analyzer or sealed with caps after removal from the housing.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An air sampling device comprising:
a housing comprising an air inlet and an air outlet;
an air pump in gaseous communication with the air inlet and air outlet;
a carrier having a first face and a second opposing face, the carrier comprising a plurality of receptacles disposed in a circumferential pattern, wherein each receptacle is configured to receive a sample tube, and wherein each receptacle comprises a first end and an opposing second end;

a first plate disposed adjacent to and substantially covering the first face of the carrier, wherein the first plate comprises a first sample opening;

a second plate disposed adjacent to and substantially covering the second face of the carrier, wherein the second plate comprises a second sample opening that is circumferentially aligned with the first sample opening relative to the receptacles of the carrier, wherein the circumferential position of the first and second sample openings defines a circumferential sample position, wherein the carrier is rotatable relative to the first and second base plates or the first and second base plates are rotatable relative to the carrier to intermittently index a receptacle into the circumferential sample position;

a gaseous path that extends from the air inlet, through the first sample opening, through the receptacle in the circumferential sample position, through the second sample opening, through the air pump, and out the air outlet; and a first seal disposed between the first end of each receptacle and the first plate at the circumferential sample position, a plurality of second seals disposed in the first end of each receptacle, and a third seal disposed between the second end of each receptacle and the second plate at the circumferential sample position, wherein the first plates substantially covers the first face of the carrier and the second plate substantially covers the second face of the carrier to seal each of the sample tubes that are not in the sample position.

2. The device of claim 1 further comprising a motor operatively connected with a bearing, wherein the bearing is operatively connected with and configured to rotate the carrier relative to the first and second base plates.

3. The device of claim 1 further comprising a purge line extending from the air inlet in the housing through the air pump and out the air outlet of the housing.

4. The device of claim 1, wherein the air flow path includes a first valve disposed upstream of the first plate and a second valve disposed downstream of the second plate to control air flow to the carrier.

5. The device of claim 4, wherein the first and second valves are solenoid valves.

6. The device of claim 5 further comprising sample tubes disposed in the receptacles, wherein the sample tubes are free of caps.

7. The device of claim 1, wherein the first, second, and third seals comprise o-rings.

8. The device of claim 1, wherein the air pump is configured to generate air flow in the range of 0.02 L/min to 20 L/min.

9. The device of claim 1, wherein back pressure in the air flow path is less than 7 psi.

10. The device of claim 1, wherein the sample tubes are substantially cylindrical.

11. The device of claim 1, wherein the plurality of receptacles are disposed in at least two circumferential rows on the carrier.

12. A method of collecting an air sample, the method comprising the steps of:

providing a housing having an air inlet and an air outlet;

providing a carrier disposed in the housing, the carrier comprising a plurality of receptacles arranged in a circumferential pattern on the carrier, wherein each receptacle has a first end and a second opposing end, wherein the carrier intermittently indexes the receptacles into a circumferential sample position;

inserting sample tubes into two or more of the plurality of receptacles;

initiating a program to collect air samples in the sample tubes at predetermined times or at predetermined time intervals;

opening the first and second valves to complete an air flow path, wherein the air flow path begins at the air inlet, flows through a first sample tube in the circumferential sample position, and out the air outlet;

sealing the receptacles and sample tubes in the circumferential sample position from air outside of the air flow path;

continuously sealing the receptacles and sample tubes not in the circumferential sample position from air outside of the receptacles;

generating air flow through the air flow path at a first predetermined rate between 0.02 L/min and 20 L/min to collect a first air sample in the first sample tube for a predetermined amount of time;

closing the first and second valves;

incrementally rotating the carrier to dispose a second sample tube in the circumferential sample position;

opening the first and second valves to complete the air flow path through the second sample tube;

sealing the receptacles and sample tubes in the circumferential sample position from air outside of the air flow path;

generating air flow through the air flow path at a second predetermined rate between 0.02 L/min and 20 L/min to collect a second air sample in the second sample tube;

closing the first and second valves; and removing the carrier from the housing.

13. The method of claim 12 further comprising the step of directing air from the air inlet directly to the air pump and out the air outlet to purge air in the air flow path.

14. The method of claim 12 further comprising the step of measuring and recording the air flow rate, temperature of the air, and/or relative humidity of the air during the step of generating air flow through the air flow path at a predetermined rate between 0.02 L/min and 20 L/min to collect a first air sample in the first sample tube for a predetermined amount of time.

15. The method of claim 12, wherein the first predetermined rate is different than the second predetermined rate.

16. The method of claim 12, wherein back pressure in the air flow path is less than 7 psi.

17. The method of claim 12 further comprising the step of: providing:

a first plate disposed adjacent to and substantially covering a first face of the carrier, wherein the first plate comprises a first sample opening;

a second plate disposed adjacent to and substantially covering a second opposing face of the carrier, wherein the second plate comprises a second sample opening that is circumferentially aligned with the first sample opening relative to the receptacles of the carrier, wherein the circumferential position of the first and second sample openings defines the circumferential sample position;

a first seal disposed between the first end of the receptacles and the first plate in the circumferential sample position;

a plurality of second seals disposed in the first end of the receptacle; and a third seal disposed between the second end of the receptacles and the second plate in the circumferential sample position.

18. The method of claim 17, wherein the first, second, and third seals are o-rings.

19. The method of claim 12, wherein the sample tubes are substantially cylindrical.

20. The method of claim 12, wherein the steps of sealing the receptacles and sample tubes not in the circumferential sample position from air outside of the receptacles does not include using caps to seal the sample tubes.

* * * * *